United States Patent [19]
Villacorta

[11] Patent Number: 4,787,591
[45] Date of Patent: Nov. 29, 1988

[54] LABORATORY CLAMP

[76] Inventor: Gilberto M. Villacorta, 17 E. Milton Rd., Brookline, Mass. 02146

[21] Appl. No.: 901,813

[22] Filed: Aug. 29, 1986

[51] Int. Cl.$^4$ ............................................. A44B 21/00
[52] U.S. Cl. .................................. 248/316.7; 248/229; 24/339; 24/562
[58] Field of Search ...................... 248/540, 541, 74.2, 248/111, 121, 125, 229, 230, 231.8, 312, 313, 316.7; 24/335, 336, 531, 556, 562, 339

[56] References Cited

U.S. PATENT DOCUMENTS

| 316,062 | 4/1885 | Riessner | 24/339 |
| 625,435 | 5/1899 | Clark | 248/229 |
| 1,423,043 | 7/1922 | Steinheiser | 248/111 |
| 1,554,118 | 9/1925 | Moran | 248/229 |
| 1,891,099 | 12/1932 | Land | 24/339 |
| 2,689,995 | 9/1954 | Smith | 248/229 |
| 2,914,831 | 12/1959 | McBrien | 248/125 |
| 3,222,020 | 12/1965 | Rea | 248/121 |
| 3,521,332 | 7/1970 | Kramer | 248/229 |
| 3,747,166 | 7/1973 | Eross | 248/229 |
| 3,905,570 | 9/1975 | Nieuwveld | 24/339 |
| 4,174,822 | 11/1979 | Larsson | 248/229 |

FOREIGN PATENT DOCUMENTS

| 2441079 | 7/1980 | France | 248/229 |
| 976555 | 11/1964 | United Kingdom | 248/230 |
| 1376738 | 12/1974 | United Kingdom | 248/74.2 |

Primary Examiner—J. Franklin Foss
Assistant Examiner—Robert A. Olson

[57] ABSTRACT

The present invention relates a simple, inexpensive clamp comprised of a flexible "C"-shaped, fixed-diameter clamping means, a rigid support member, and a "C"-shaped anchoring means whose overall design and construction allows the user to fasten, secure, and release objects quickly and easily with a minimum level of dexterity.

12 Claims, 4 Drawing Sheets

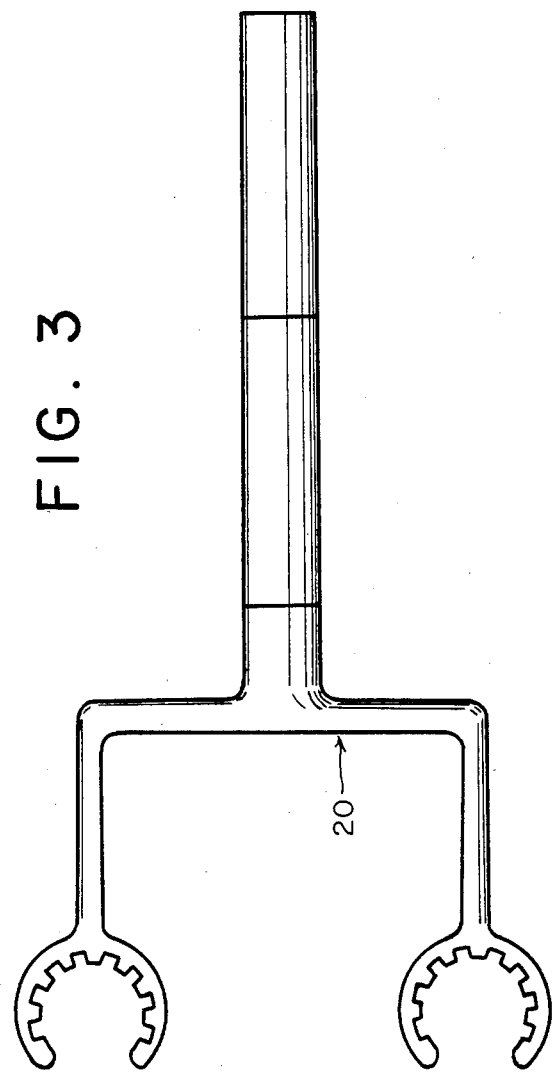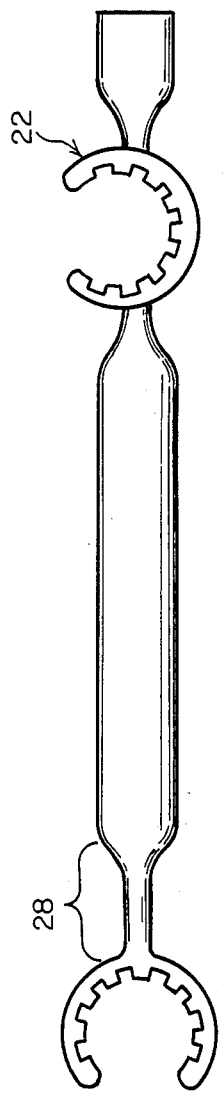

LABORATORY CLAMP

BACKGROUND OF INVENTION

1. Field of Invention

This invention relates to clamps which may be used to fasten and release with relative ease rods, hoses, burets, electrodes, pipes, cylindrical columns, test tubes, poles, posts, reaction vessels and many other laboratory, household, industrial, and commercial items.

2. Description of the Prior Art

Presently, a typical clamp used to secure laboratory apparatus consists of a rigid extension rod used as the support member to which is connected the clamping mechanism or means. The clamping means is usually comprised of two curved arms, uses one or two screws to open and close the arms around an object and is attached to one end of the extension rod. These clamps come in several sizes and are intended to hold items as small as a 5 milliliter (mL) round-bottom flask to objects as large as a 4000-mL Erlenmeyer flask. These clamps are made of metal, are heavy, can be quite expensive, eventually corrode, and often can be awkward to use because of the necessity to close the "jaw" of the clamp by means of screws. There is also a finite amount of time associated with turning the screws (assuming they are not corroded and one can turn them at all!) and making sure that equal pressure is exerted on either side of the object being secured. Perhaps more importantly, this operation requires both hands: one for holding the object while the other is used going back and forth in an effort to tighten the opposite screws as evenly as possible. Furthermore, workers who suffer from a physical handicap (for instance, those with only one useful hand or with impaired motor skills) can find present clamps very difficult if not impossible to use.

Time and dexterity are important considerations during the critical moments of a laboratory experiment. Situations frequently arise when a flask has to be transferred quickly from one area of the bench to another, or from the bench to a vented space or within the venting hood from a heating bath to a cooling medium. Success or failure can be governed by the speed with which one can work. Additionally, the manipulation of syringes, needles, reagent bottles, hoses, and jack stands during the course of a single reaction, all the while wearing gloves (or worse while working in a drybox wearing heavy gloves), requires considerable skill. The successful performance of these various jobs is hampered by difficult to manipulate clamps. One could recruit the help of an assistant to hold the flask or object in position while one uses both hands to simultaneously tighten down the screws of an ordinary clamp (even so one has to work around the assistant's arm). Clearly, there is a need for a device that can secure and release an object such as a reaction flask in one quick and easy motion and which allows the use of only one hand (the one holding the object), thus freeing the other hand to do something else (like hold a syringe). Such an ideal clamp would be of considerable utility to a skilled worker, let alone to one with a physical handicap.

SUMMARY OF THE INVENTION

Accordingly, it is an object of this invention to provide a clamp which does not suffer the numerous disadvantages of existing clamps.

It is another object of this invention to provide a clamp which permits the easy clamping and securing of an object.

It is another object of this invention to provide a clamp which can be used to secure an object using only one hand.

It is another object of this invention to provide a clamp from which the clamped object can be released using only one hand.

It is an object of this invention to provide a clamp for holding securely one or more objects of a variety of shapes and sizes.

It is another object of this invention to provide a clamp which can be easily secured to an existing lattice and allows for the easy adjustment of the vertical or horizontal displacement in space of the object it secures.

It is another object of this invention to provide a useful lightweight, durable, inexpensive clamp that is resistant to corrosion.

It is another object of this invention to provide a clamp which may be easily manipulated by a person suffering from a slight physical handicap.

The inventor has now surprisingly discovered a novel clamp which satisfies all the above objects of this invention. Other objects and advantages of the invention will become apparent from the following description considered in conjunction with the accompanying drawings.

According, the present invention relates a simple inexpensive, and durable clamp which can hold a clamped object securely, and allows the user to secure and release objects quickly and easily by means of a push-pull motion and requiring only one hand for this operation. The clamp is constructed of at least two sections, the clamping means and the support member. The clamping means is shaped in a "C"-configuration and is made of a non-rigid material or combinations thereof that are well known in the art. This flexible property of the clamping means allows the clamp to momentarily expand, accepting the object to be secured, and then snapping back into its original form but now applying even pressure around the object thus keeping it in place. Likewise, releasing the object from the grip of the clamp requires only the opposite motion of pulling the object away from the clamp. The clamping means is fixed to a rigid extension rod which is then held in place by a clamp holder onto an existing lattice or ring stand. The extension rod or support member may be constructed in a number of segments secured to each other by threaded unions. In this way, the length of the rod, as well as the size and shape of the clamping means, may be changed. Thus, components of the clamp can be made interchangeable and the user may, for example, convert a single-headed clamping means into a double-headed one for holding two objects in close proximity.

Optionally, a third section may be added to the clamp. This third section is an anchoring means which is attached to the end or the side of the support member opposite to that of the clamping means. This anchor is also of an approximate "C"-configuration and constructed of a non-rigid material; its function is to anchor the clamp onto the existing lattice or ring stand without the use of a clamp holder. Similar to the expanding-contracting action of the clamping means, the anchor may be "snapped" onto the cylindrically shaped lattice by a simple one-step motion. The pressure exerted by the anchor around the lattice is sufficient to hold the clamp and the object it has secured in position but allows the user to alter this displacement in the vertical and horizontal direction by simply sliding the clamp up or done the lattice or pushing it from side to side. It should be noted that the weight of the object being secured generates a torque which locks the whole clamp into position. The adjustment of the vertical position of the clamp may be accomplished by grasping both the front and the rear portion of the support member and pushing up or down. The opening gap of the anchoring means' "C" is substantially at right angles to the opening gap of the "C"-shaped clamping means. This arrangement allows objects to be secured and released at the clamping means without accidentally pulling the entire clamp from the lattice or ring stand.

BRIEF DESCRIPTION OF THE DRAWINGS

FIG. 3 is a perspective illustrating one configuration of a double-headed modification of the invention.

FIG. 4 is a perspective illustrating a clamp with an anchoring means built into the support member.

DETAILED DESCRIPTION OF THE PREFERRED EMBODIMENTS

Figure 1:
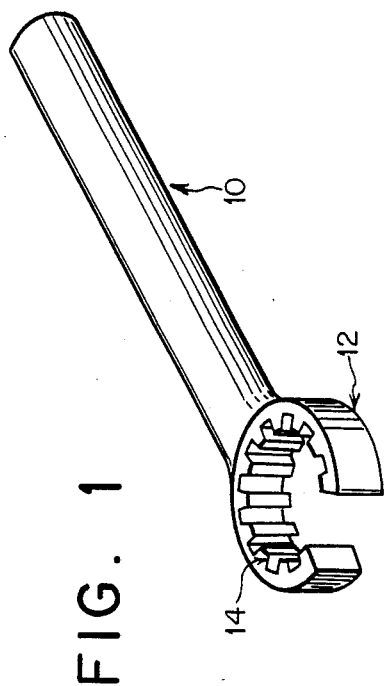
FIG. 1 is a perspective illustrating one embodiment of the invention.

The clamp of the present invention may have a rigid extension rod 10 to one end of which is attached one or more flexible "C"-shaped clamping means 12. The "C"-shaped clamping means may have "teeth" 14 built into the clamping surface to facilitate the gripping of objects to be secured. The clamping means may also be tapered 30 to accommodate the shape of tapered objects. The extension rod or support member may be constructed of a number of sections 16 joined by threaded unions 18. In this manner the length of the support member may be varied and the nature of the clamping means may also be changed. For example a single-headed clamping assembly maybe replaced by a double-headed one 20. The support member may also be attached to a second "C"-shaped member 22 which serves as the anchoring means. The anchoring means allows the user to fix and hold the position of the clamp on an existing lattice framework or ring stand 24 without the use of a clamp holder 26. The disposition of the two "C"-shaped members, the clamping means and the anchoring means, is such that the opening gap is one is substantially at right angles to the opening gap of the other.

The clamp may be easily manufactured as a one-piece unit or in segments by an injection molding process using any number of engineering plastics and polymers or combinations of these. Materials such as ABS resin, Delrin, Celcon, polyacetal, high and low-density polyethylene, PPO/styrene, polyacrylonitrile, and other materials well known in the art can convey the desirable properties of flexibility, memory retention, thermal stability, and resistance to harsh aqueous or organic solvents, gases, or fluids to the components of the clamp. Other materials such as metals, alloys, graphite, or wood may also be used.

Figure 7:
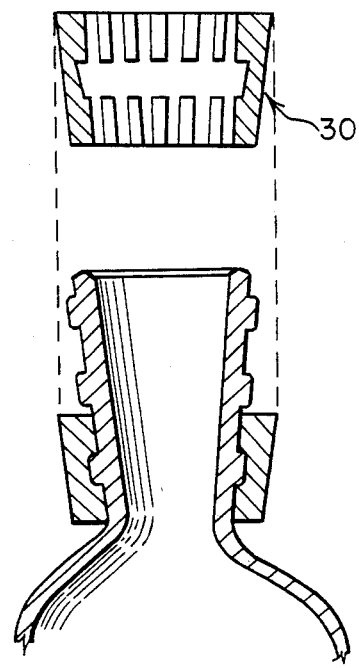
FIG. 7 is a cut-out perspective of a tapered, grooved clamping means securing a collared laboratory flask.

The exact dimensions of the clamp are dictated by the particular application. For example, where mini-laboratory glassware (14/20 neck joints) is to be secured, the opening gap, the inside diameter, the outside diameter, and the height of the clamping means may be about 13, 17, 25, and 10 mm, respectively. The diameter and length of the support member may be about $10 \times 140$ mm. These six dimensions in the same order may be about 15, 22, 30, 10 and $10 \times 150$ mm for medium-sized flasks (those with 19/22 joints). For large flasks (24/40 joints), these dimensions are 20, 25, 36, 20 and $12 \times 180$ mm, respectively. Some 24/40 joint flasks come with a tapered and collared neck. For these flasks a specially tapered and grooved clamp 30, illustrated in FIG. 7, may be used. True to its tapered design, the measurements at the top are slightly larger than those at the bottom. For example the inside diameter and gap opening at the top may be about 25 and 20 mm, respectively, while the corresponding dimensions at the bottom end may be about 24 and 19 mm. The middle groove 32 may measure about 27 mm in diameter and about 4 mm in breadth. As shown in FIG. 7, the clamp is positioned to accept the bottom collar of the tapered neck. Sufficient room is left at the top exposed end of the neck so that a rubber septum may be inserted into the mouth of the flask and folded over the sides without interference from the clamping means. The dimensions given above are for purposes of illustration and are obviously rough figures which can be varied.

Figure 5:
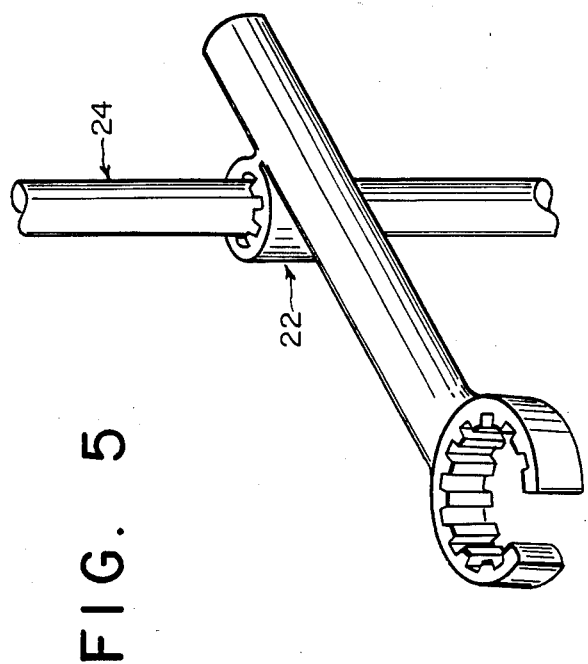
FIG. 5 illustrates a lattice framework and an embodiment of the invention with the built-in anchoring means.
Figure 6:
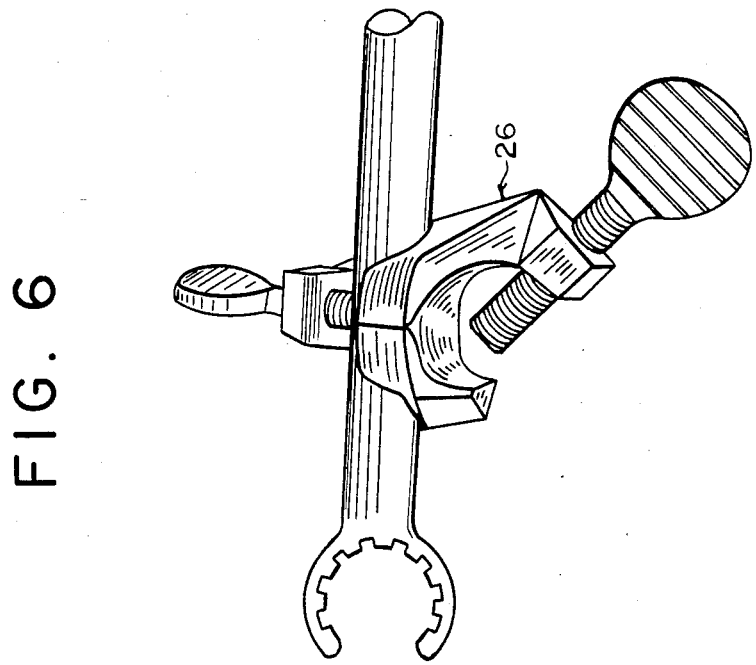
FIG. 6 is a perspective illustrating one embodiment of the invention secured by a clamp holder.

The opening gap and inside diameter of the anchoring means may measure about 9 and 12 mm, respectively. The height of the anchoring means may be about twice the diameter of the support member. These dimensions are uniform for each of the clamps described above as they will all be anchored to the same existing lattice framework which are constructed of cylindrical aluminum rods about 12.2 mm in diameter (see FIG. 5).

I have found that clamps having the dimensions given above accept, secure, and release objects such as flasks easily and reproducibly, exerting sufficient pressure around the neck of the object to hold it and its contents with confidence. The lip that is present on all flasks prevents the object from slipping through when force is exerted in the vertical direction during the course of an experiment (for example, when puncturing the rubber septum fitted over the mouth of the flask with a needle).

The fixed diameter and "C"-shaped design of the clamping means eliminates the need for the adjusting screws present in existing clamps. These screws are the cause of a number of problems associated with existing clamps which the present invention circumvents. These problems include the tendency of the screws to corrode until they can no longer be turned, the need for an inconvenient amount of time and level of dexterity to manipulate the screws (especially while wearing rubber gloves), and the preoccupation of both the researcher's hands. In addition, the present invention is lighter in weight and cheaper to manufacture. It should be pointed out the the feature to clamp a range of different-sized objects, a feature present in existing clamps by virtue of the adjustable screws, is superfluous when dealing with objects which themselves have a fixed diameter. Thus a small clamp can accommodate all mini-labware flasks with volumes ranging from 2 to 250 milliliters since they all have 14/20 joint necks! The same argument applies to all other objects which the clamp can be designed to hold as long as they have a common dimension (e.g., the neck) to which the clamping means can be positioned.

I have also found that the tapered modification 28 for the support member (shown in FIG. 2 or 4) where it joins the clamping means imparts better flexibility to the clamping means and distributes the stress created during the expansion process more evenly across the entire length of the "C", while at the same time retaining the strength and rigidity required of the support member. The "C"-shaped head may contain "teeth," as shown in FIGS. 1–7, which aid in the flexibility and memory of the piece and also help in applying greater pressure at specific points around the object resulting in a tighter grip.

Figure 2:
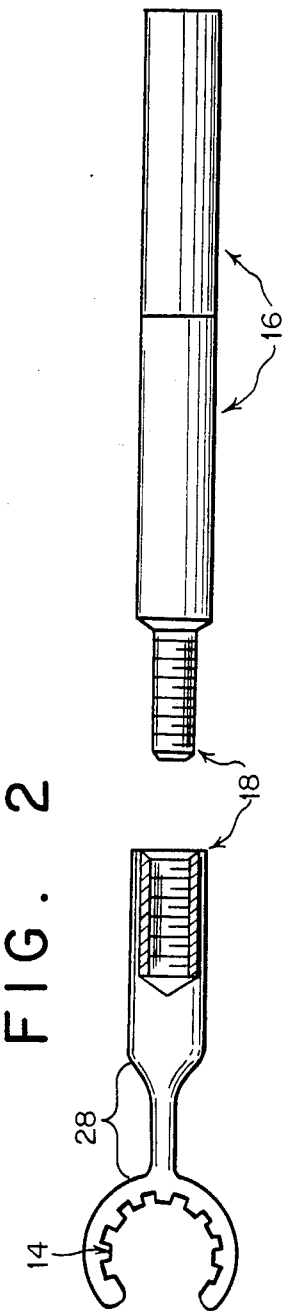
FIG. 2 is a perspective illustrating one embodiment of the invention having multisectional parts joined together by threaded unions.

Departures from the single-shaft design and configuration shown in FIG. 1 can be envisioned readily. These include configurations illustrated in FIGS. 5–7. Multiple piece construction which allows for a degree of flexibility in the length of the support member and the nature of the clamping head is shown in FIG. 2. The double-headed clamping head pictured in FIG. 3 provides the user with a convenient means of securing two objects in close proximity without the need for two clamps. Experiments are often performed in duplicate, and this modification of the clamp permits the immersion of more than one object in the same controlled-temperature bath assuring the duplicate conditions. Alternatively, these multiple-headed clamps may also be arranged in a vertical relationship with the distance between the clamping heads dictated by the particular application. They may be six inches apart to hold columns and burets or they may be much closer (several millimeters) to secure ball and socket or O-ring joints.

Another useful device of which the clamp would be an integral part can be a lightweight miniature ring stand for use in holding and transporting a reaction flask to and from the drybox. At present there is no adequate means of safely transferring a reaction vessel (usually a round-bottom flask) from the bench into and out of the drybox. Cork rings cannot be used as they are porous and can introduce undesirable air into the inert drybox atmosphere. A mini-ring stand made of solid material (e.g., plastic) and the clamp, used in conjunction with or made part of the ring stand assembly, can be used to secure the round-bottom flask in an upright position without worry of air contamination or spillage. The entire assembly should be small and light enough to be carried on a tray without extra effort.

It should be apparent from the foregoing that the present invention contemplates a one or multiple-piece clamp with a flexible "C"-shaped head joined to a rigid support member which allows for the easy clamping and releasing of many kinds of objects. It should be apparent that the present invention also contemplates a device such as that described above with a "C"-shaped anchoring member attached to one end of the supporting rod which allows for the easy anchoring, positioning, and releasing of the clamp assembly with respect to an existing lattice framework, portions thereof, ring stand, or other fixed or portable support.

It should likewise be obvious that various changes may be made to the described embodiments of the present invention without departing from the scope and spirit thereof, that a clamp of virtually any size and configuration can be produced to fit any particular need, and therefore the invention is not limited by that which is illustrated in the drawings and described in the specifications.

I claim:
1. An easy to fasten and release clamp comprising:
   (i) one or more resilient fixed-diameter plastic clamping means having a curved circular member with an inner and an outer surface an an open gap such that said clamping means is "C"-shaped when viewed from the top, said curved member having a uniform thickness which allows said curved member to expand and contract in response to lateral pressure directed at said open gap when an object is forced against said open gap, and wherein said inner surface bears a continuous corrugated pattern of vertical cog-like teeth; and
   (ii) a rigid cylindrical plastic extension rod having a forward and a rear end, said forward end being joined to said outer surface of said curved member substantially opposite said open gap, and wherein said forward end is tapered and narrowed along vertical planes to match the thickness of said curved member.

2. The clamp of claim 1 which comprises a plurality of clamping means joined to a plurality of support members branching out from said forward end of said extension rod.

3. The clamp of claim 2 which comprises two clamping means oriented side by side along the same horizontal plane.

4. The clamp of claim 2 which comprises two clamping means oriented one above the other along the same vertical plane.

5. The clamp of claim 1 which comprises a multisectional extension rod interconnected by threaded male-female unions.

6. The clamp of claim 1 in which said extension rod further comprises a "C"-shaped, fixed-diameter plastic anchoring means having an open gap, said open gap of said anchoring means oriented substantially at right angles relative to said open gap of said clamping means.

7. An easy to fasten and release clamp comprising:
   (i) one or more resilient fixed-diameter plastic clamping means having a curved circular member with an inner and an outer surface and an open gap such that said clamping means is "C"-shaped when viewed from the top, said clamping means further having a tapered shape when viewed from the side, and said curved member having a uniform thickness with allows said curved member to expand and contract in response to lateral pressure directed at said open gap when an object is forced against said open gap, and wherein said inner surface bears a continuous corrugated pattern of vertical cog-like teeth and an extra inner groove cut along a horizontal plane; and
   (ii) a rigid cylindrical plastic extension rod having a forward and a rear end, said curved member substantially opposite said open gap, and wherein said forward end is tapered and narrowed along vertical planes to match the thickness of said curved member.

8. The clamp of claim 7 which comprises a plurality of clamping means joined to a plurality of support members branching out from said forward end of said extension rod.

9. The clamp of claim 8 which comprises two clamping means oriented side by side along the same horizontal plane.

10. The clamp of claim 8 which comprises two clamping means oriented one above the other along the same vertical plane.

11. The clamp of claim 7 which comprises a multisectional extension rod interconnected by threaded male-female unions.

12. The clamp of claim 7 in which said extension rod further comprises a "C"-shaped, fixed-diameter plastic anchoring means having an open gap, said open gap of said anchoring means oriented substantially at right angles relative to said open gap if said clamping means.

* * * * *